United States Patent
Nakagawa

(10) Patent No.: US 8,724,351 B2
(45) Date of Patent: May 13, 2014

(54) CONTROLLER FOR LOAD DRIVE SYSTEM

(75) Inventor: Tomoaki Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 13/377,111

(22) PCT Filed: May 21, 2010

(86) PCT No.: PCT/JP2010/058628
§ 371 (c)(1), (2), (4) Date: Dec. 8, 2011

(87) PCT Pub. No.: WO2010/143514
PCT Pub. Date: Dec. 16, 2010

(65) Prior Publication Data
US 2012/0075900 A1 Mar. 29, 2012

(30) Foreign Application Priority Data
Jun. 9, 2009 (JP) .................................. 2009-138314

(51) Int. Cl.
*H02M 1/12* (2006.01)
*H02M 1/14* (2006.01)
*H02J 1/02* (2006.01)

(52) U.S. Cl.
USPC .............................................. 363/39; 363/41

(58) Field of Classification Search
USPC ................................... 363/41, 56.02, 132, 39
See application file for complete search history.

(56) References Cited

U.S. PATENT DOCUMENTS

| | | | | |
|---|---|---|---|---|
| 5,532,569 A | * | 7/1996 | Tanamachi et al. | 318/802 |
| 5,736,825 A | * | 4/1998 | Kaura et al. | 363/41 |
| 6,324,085 B2 | * | 11/2001 | Kimura et al. | 363/132 |
| 7,423,494 B1 | * | 9/2008 | Xin-LeBlanc | 363/41 |
| 8,138,712 B2 | * | 3/2012 | Yamada | 318/807 |
| 2012/0056569 A1 | * | 3/2012 | Takamatsu et al. | 318/400.26 |

FOREIGN PATENT DOCUMENTS

| | | |
|---|---|---|
| CN | 1659774 A | 8/2005 |
| JP | 2000-102290 A | 4/2000 |
| JP | 2005-168161 A | 6/2005 |
| JP | 2006-101675 A | 4/2006 |

OTHER PUBLICATIONS

Chinese Office Action issued in Application No, 201080025434.7, dated Nov. 5, 2013, 6 pages.

* cited by examiner

*Primary Examiner* — Jue Zhang
(74) *Attorney, Agent, or Firm* — Arent Fox LLP

(57) ABSTRACT

A controller for a load drive system which can reduce a ripple current which flows in a smoothing capacitor even when an inverter is PWM controlled with a two-phase modulation includes a converter for changing an output voltage of a DC power supply, an inverter for transforming a DC voltage outputted from the converter into a three-phase AC voltage to be applied onto a load and a smoothing capacitor provided in parallel between the converter and the inverter includes an inverter controller for PWM controlling the inverter with a two-phase modulation and a converter controller for PWM controlling the converter.

6 Claims, 16 Drawing Sheets

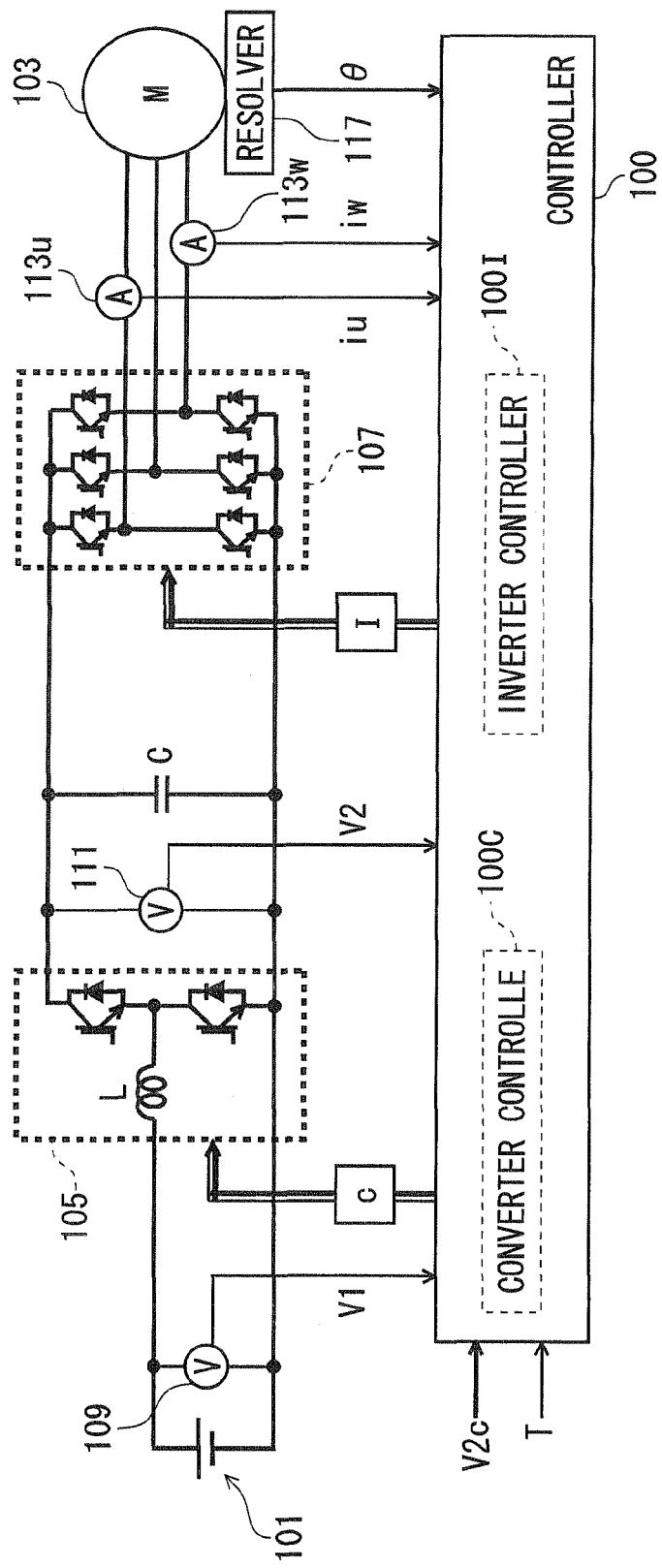
FIG. 1

FIG. 2
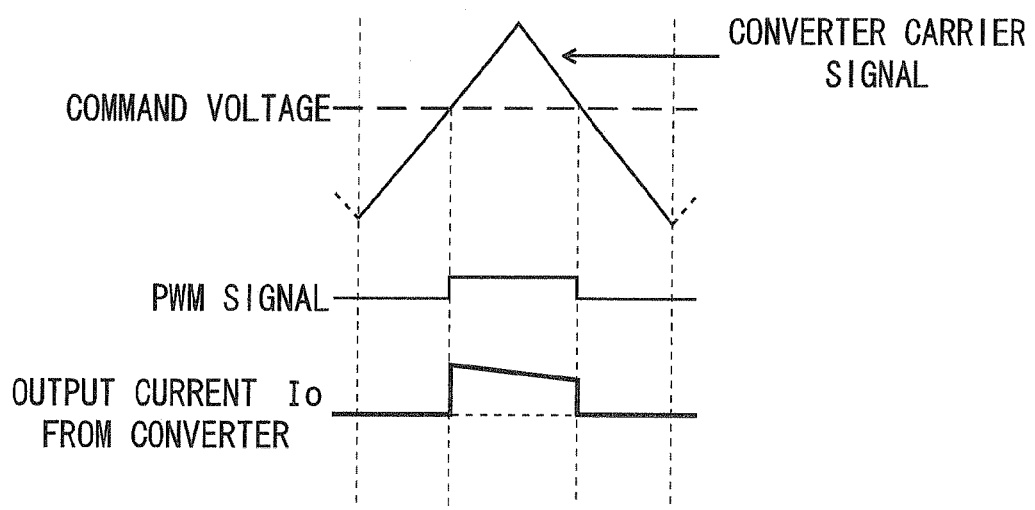

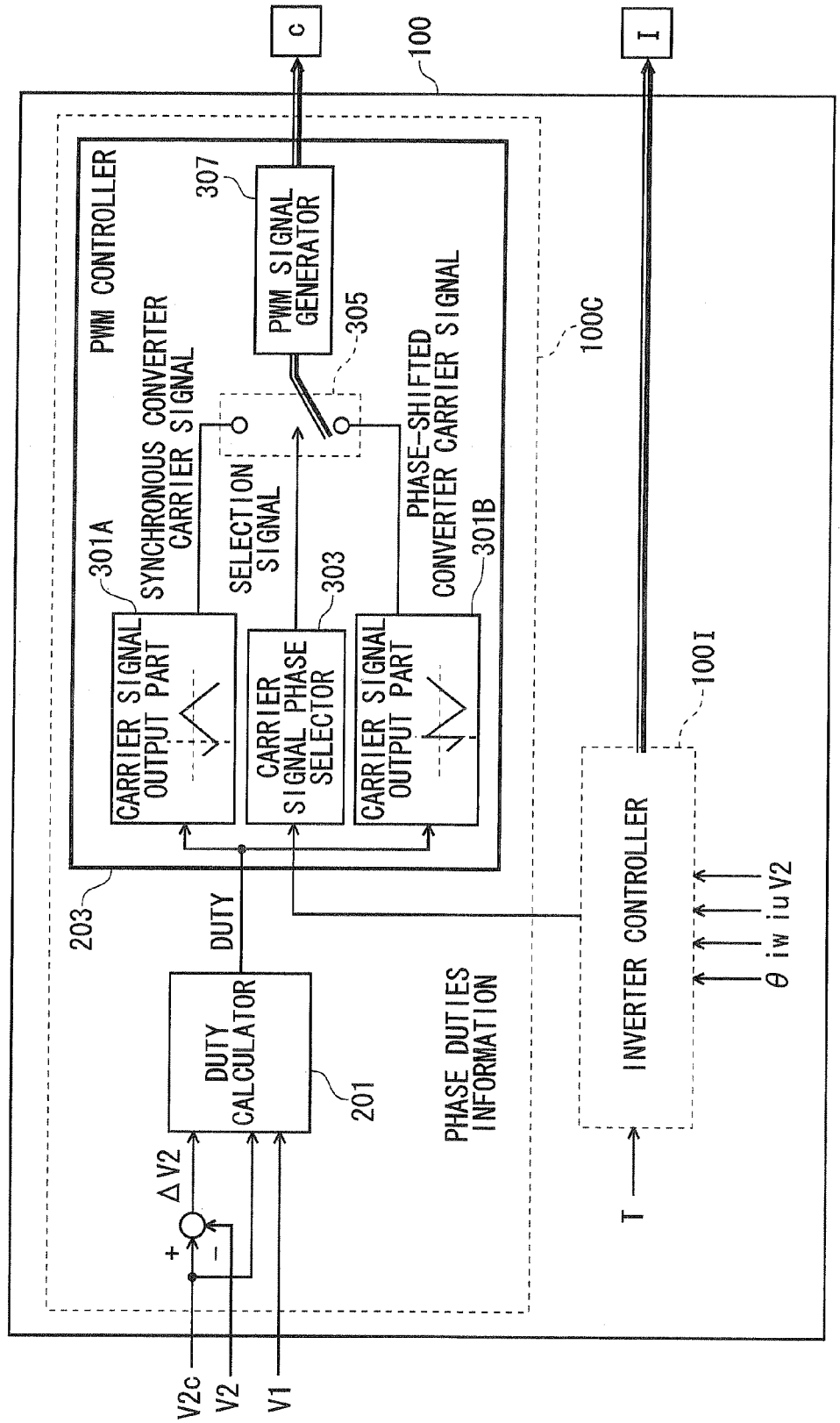
FIG. 3

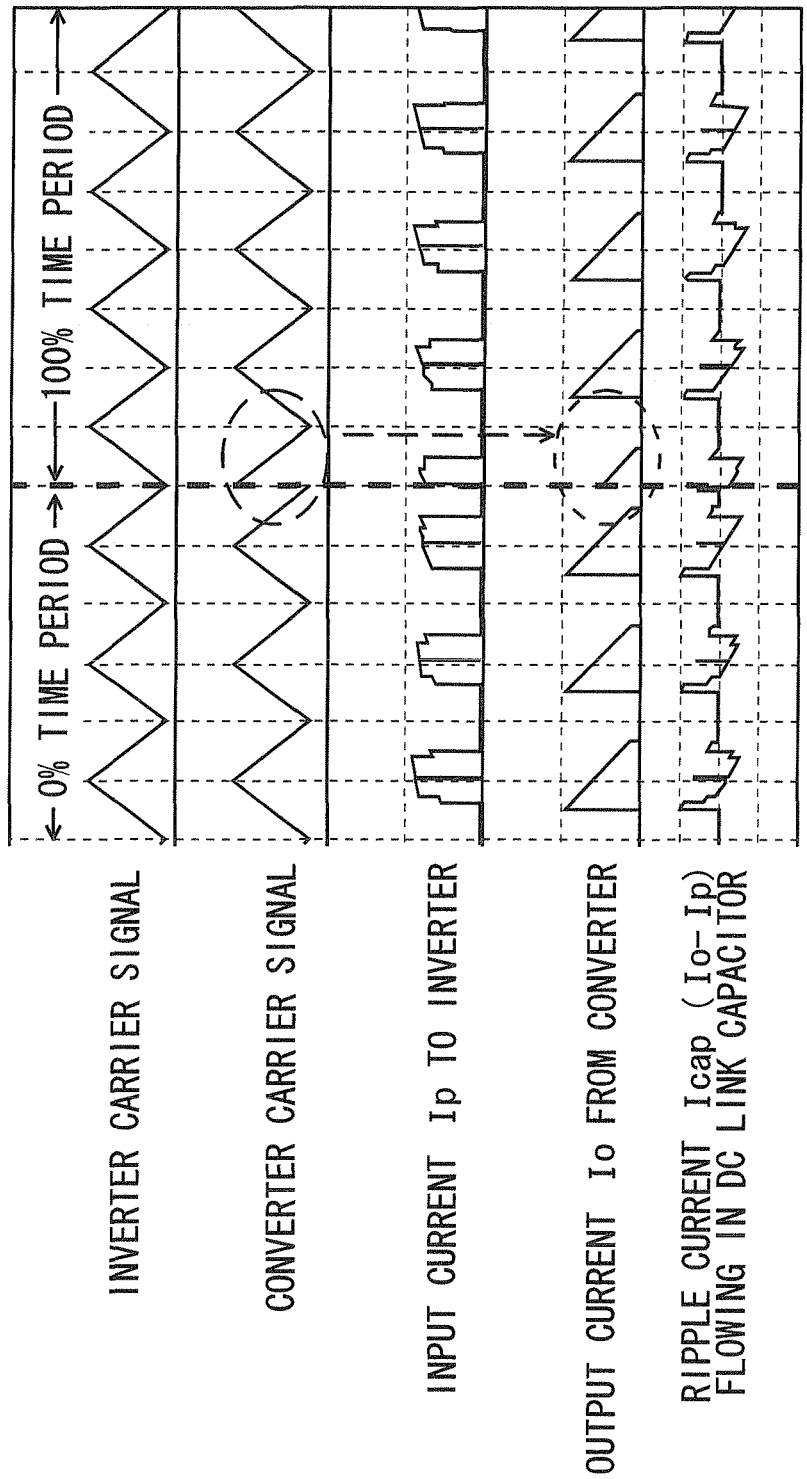
FIG. 4

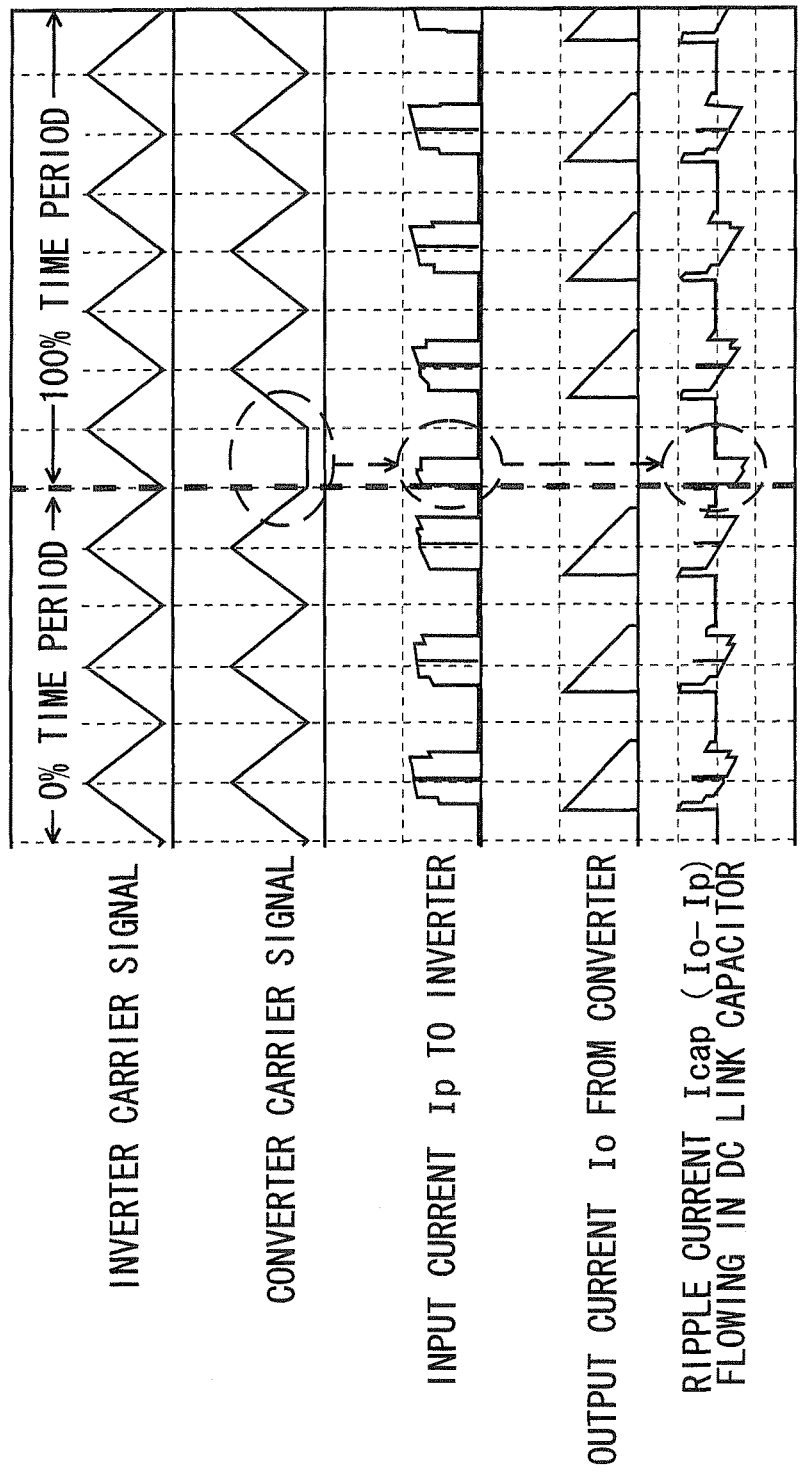
FIG. 5

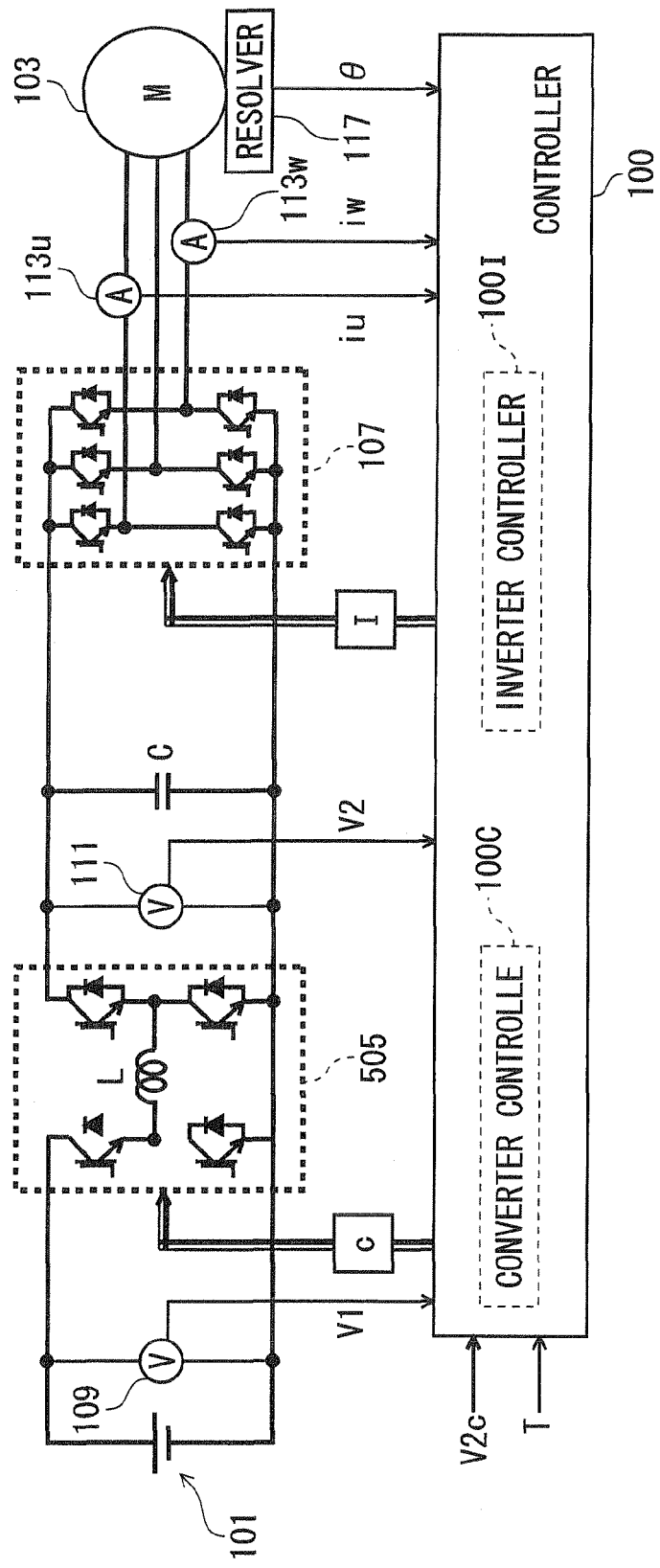
FIG. 6

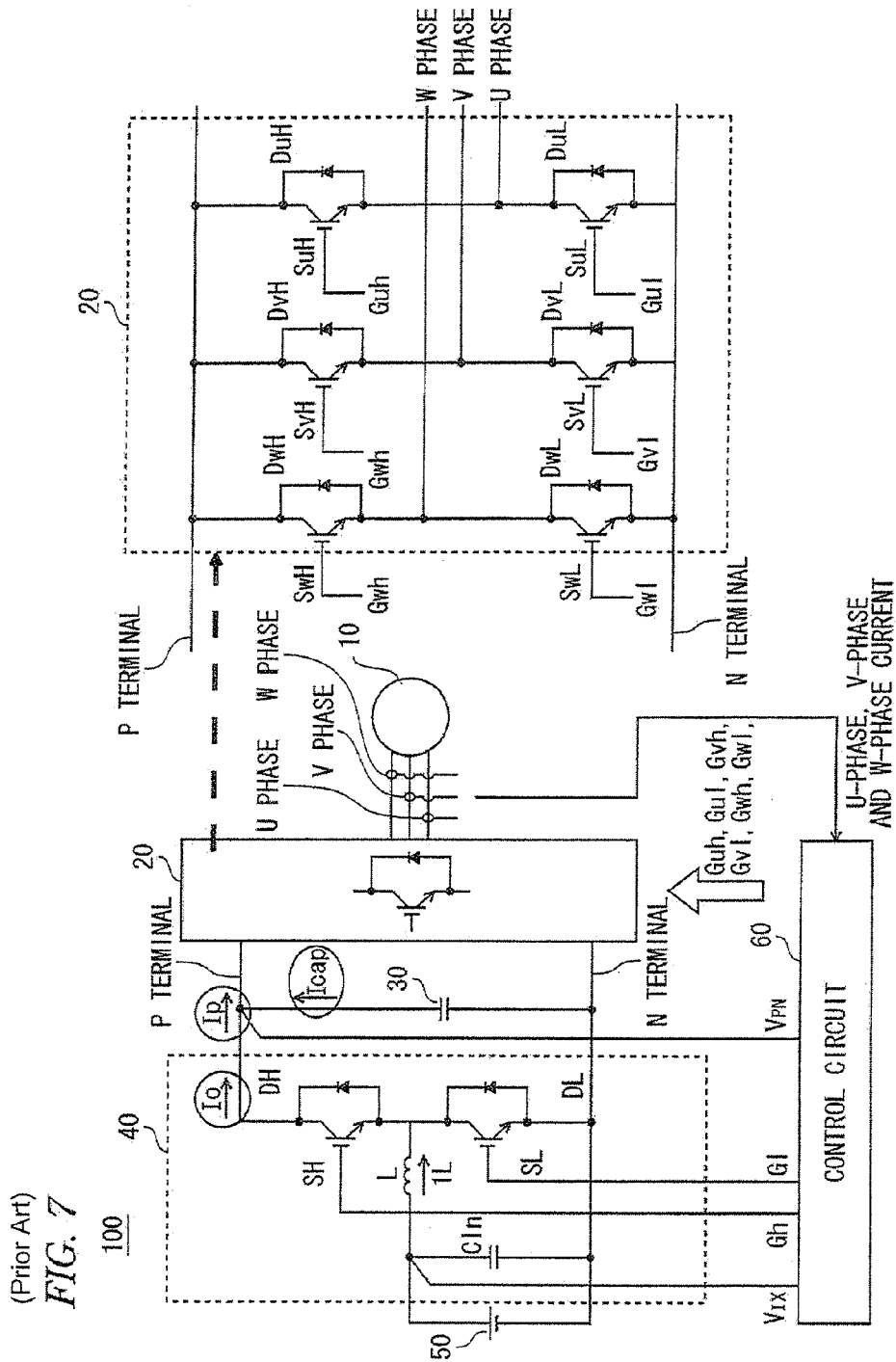
FIG. 7 (Prior Art)

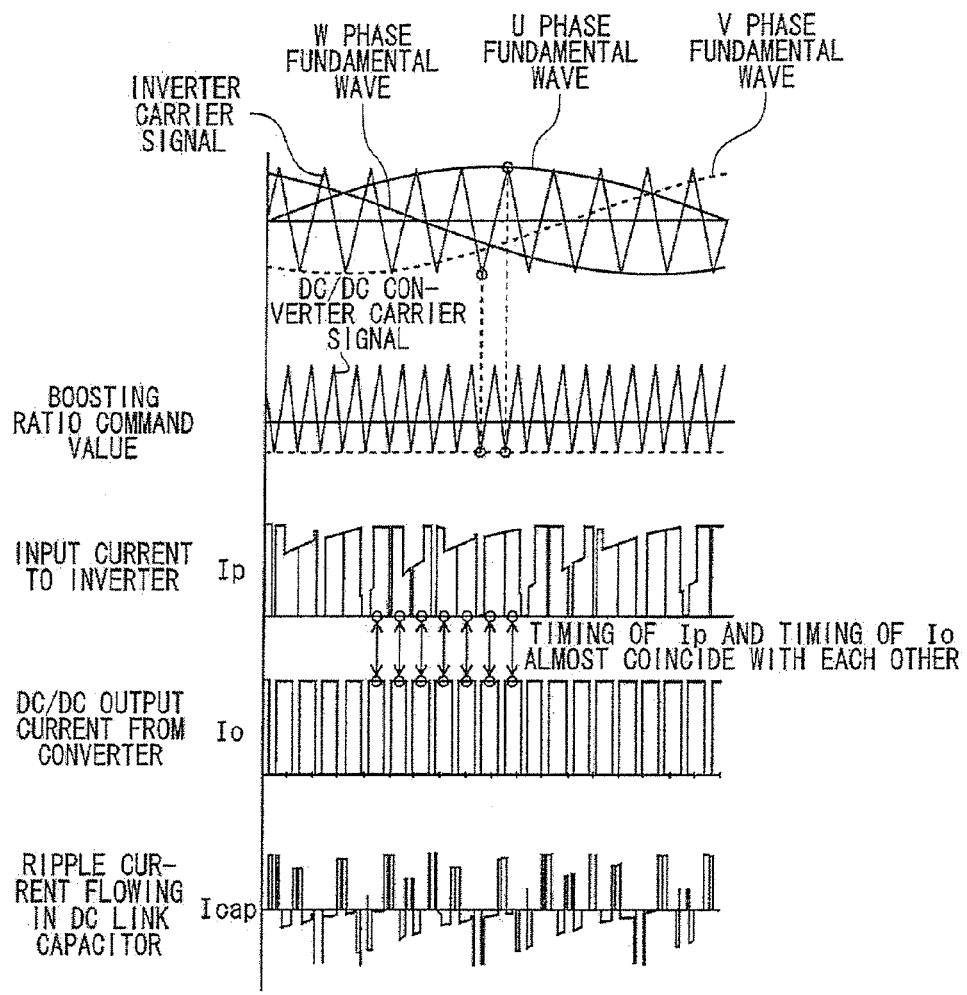
(Prior Art)
FIG. 8

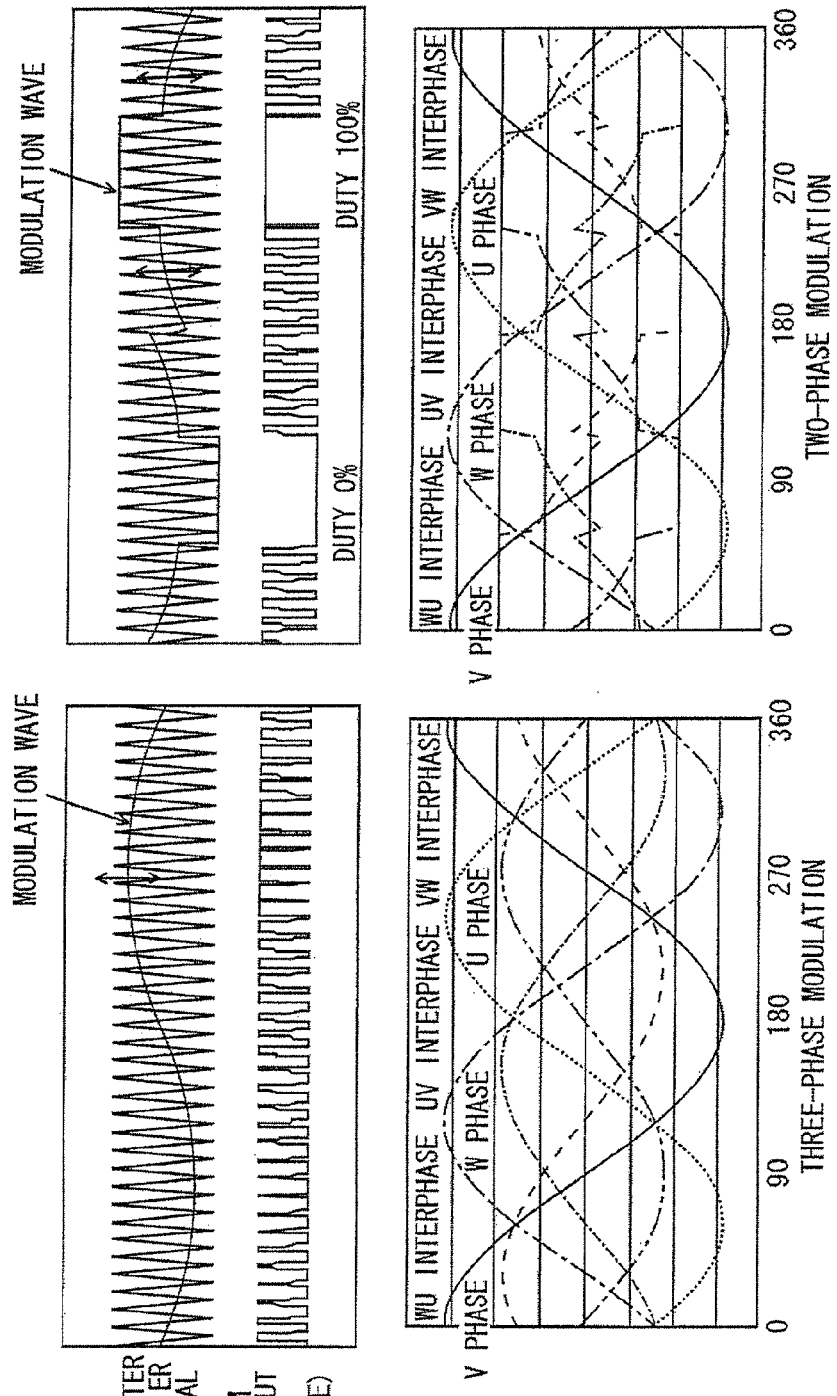
(Prior Art) FIG. 9A
(Prior Art) FIG. 9B (Prior Art)
FIG. 10
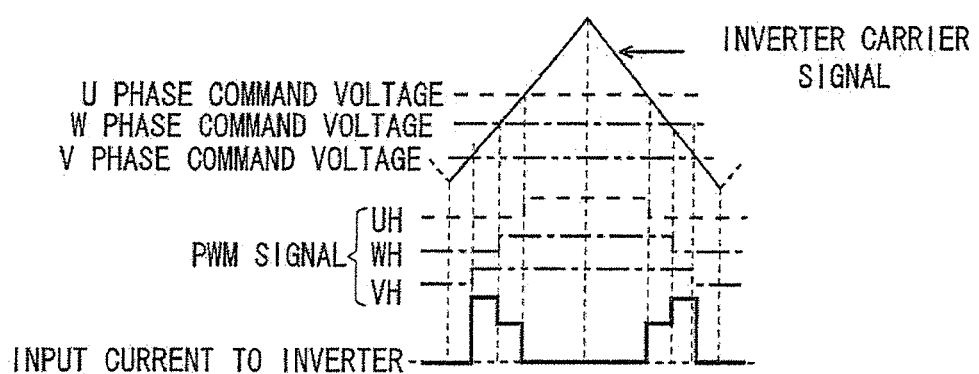

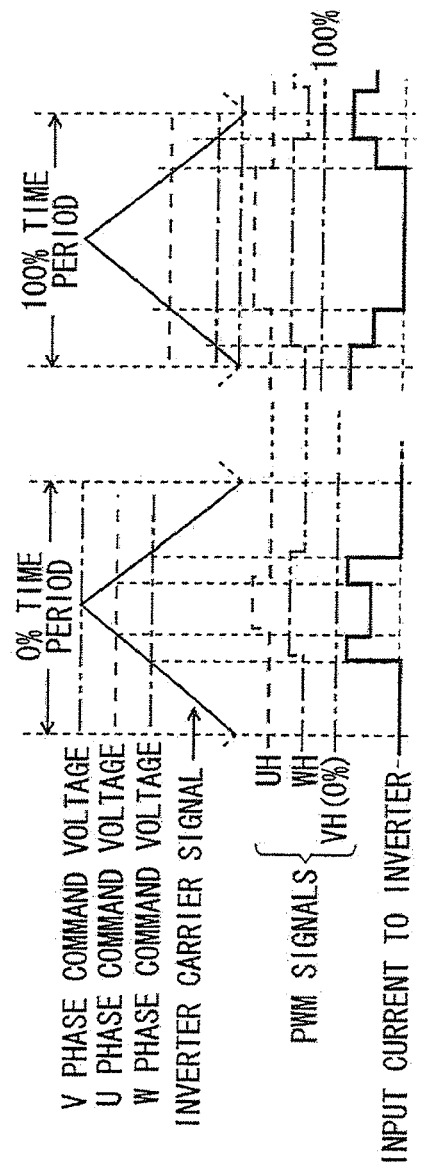
(Prior Art)
FIG. 11A
(Prior Art)
FIG. 11B

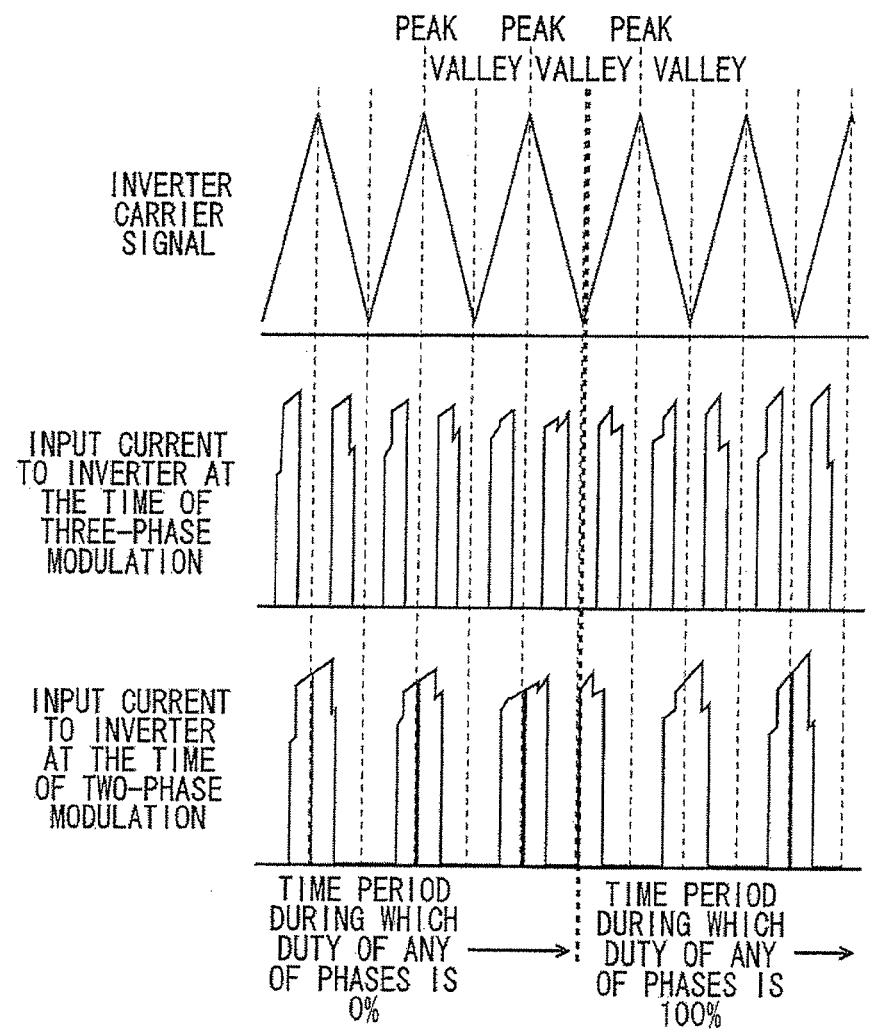
(Prior Art)
FIG. 12

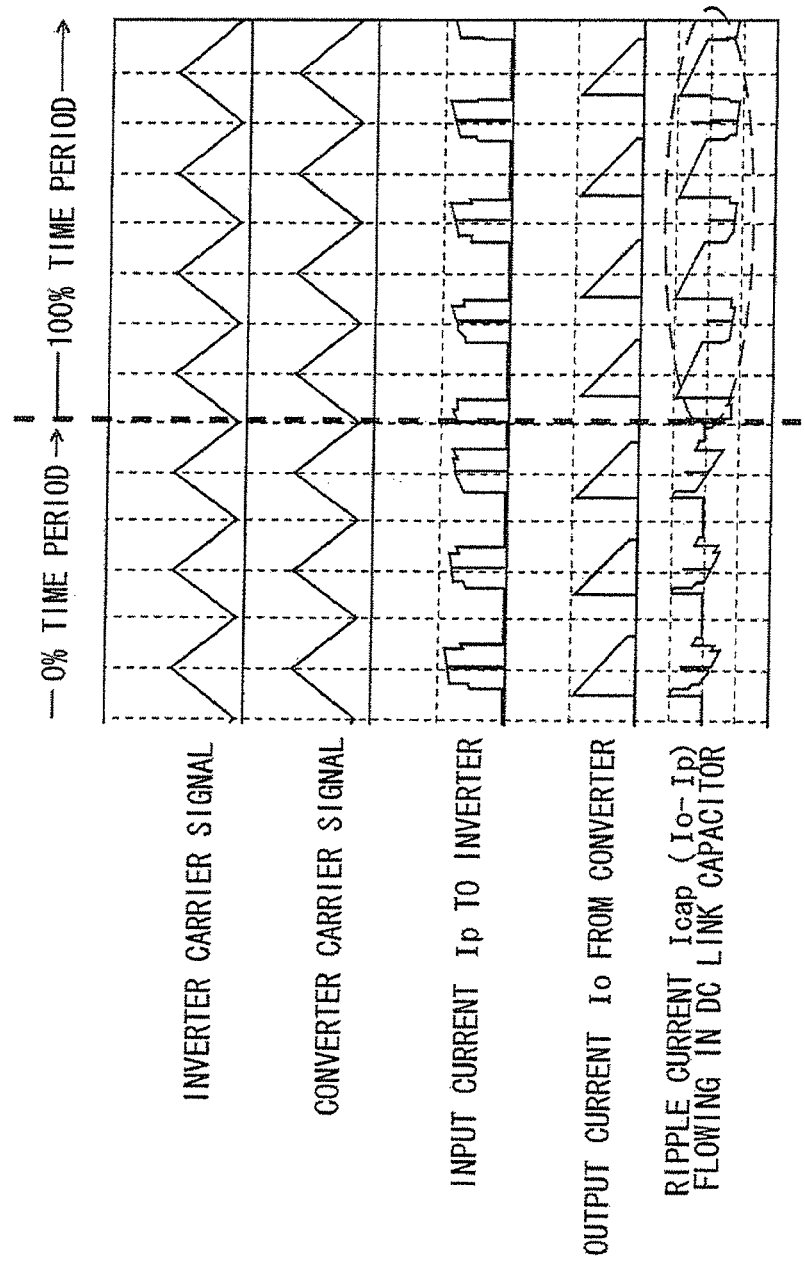
(Prior Art)
FIG. 13

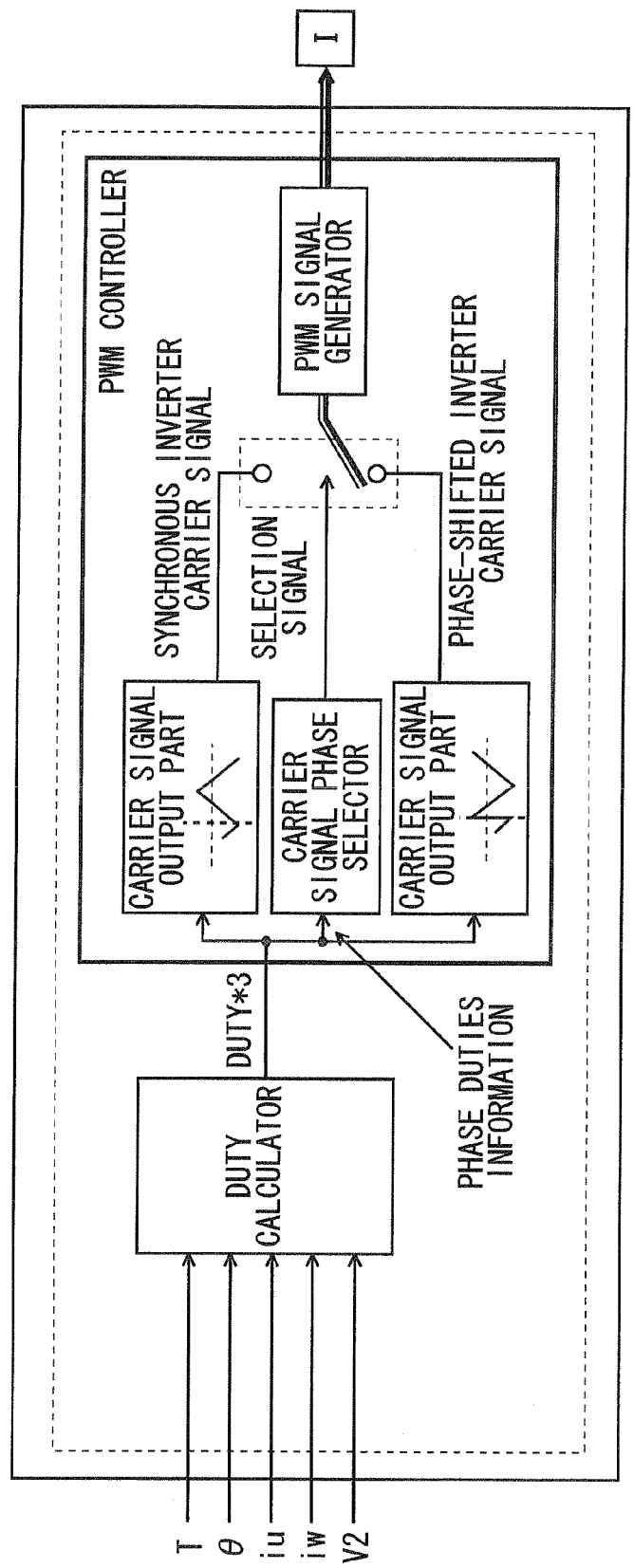
FIG. 14

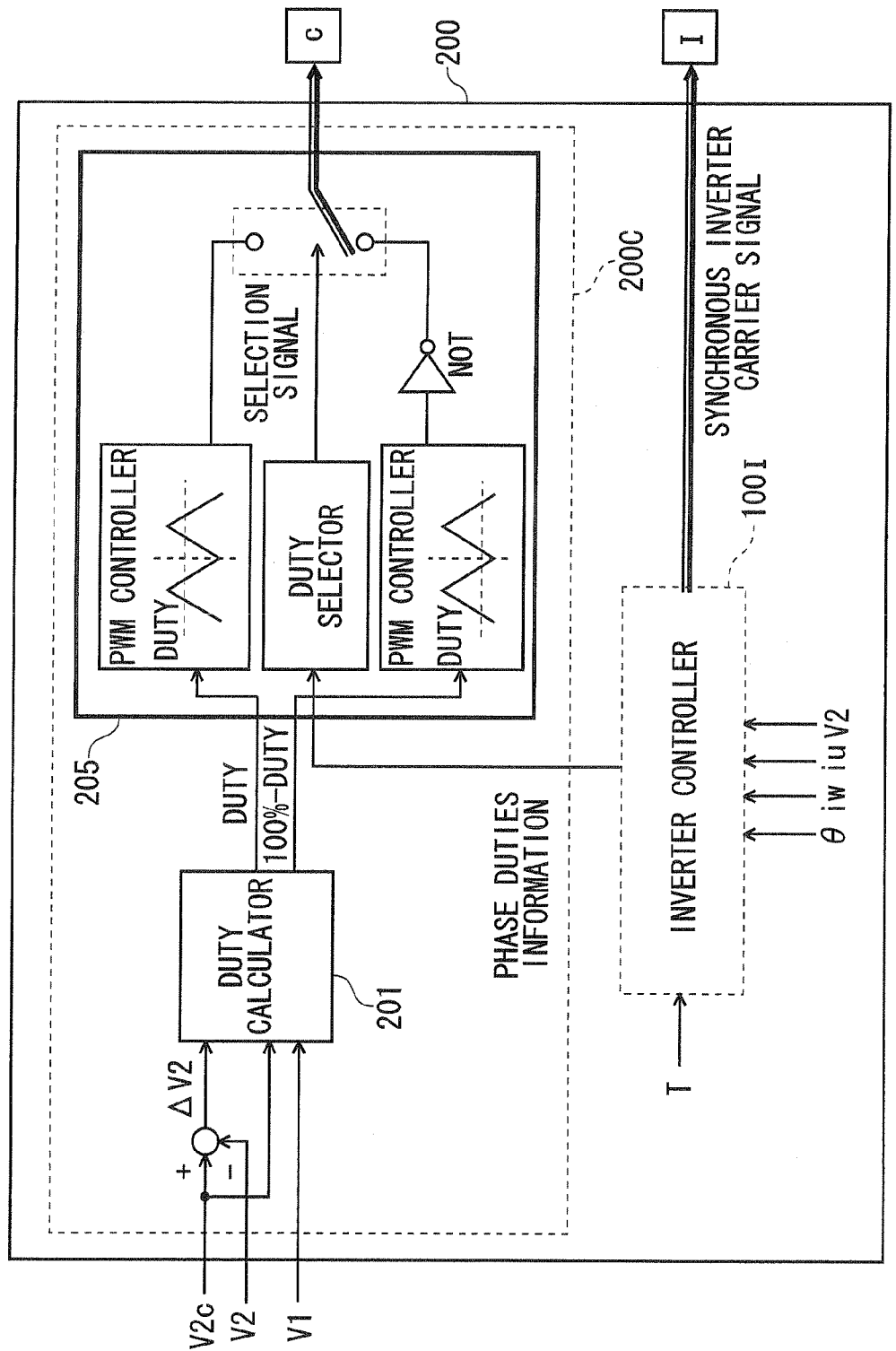
FIG. 15

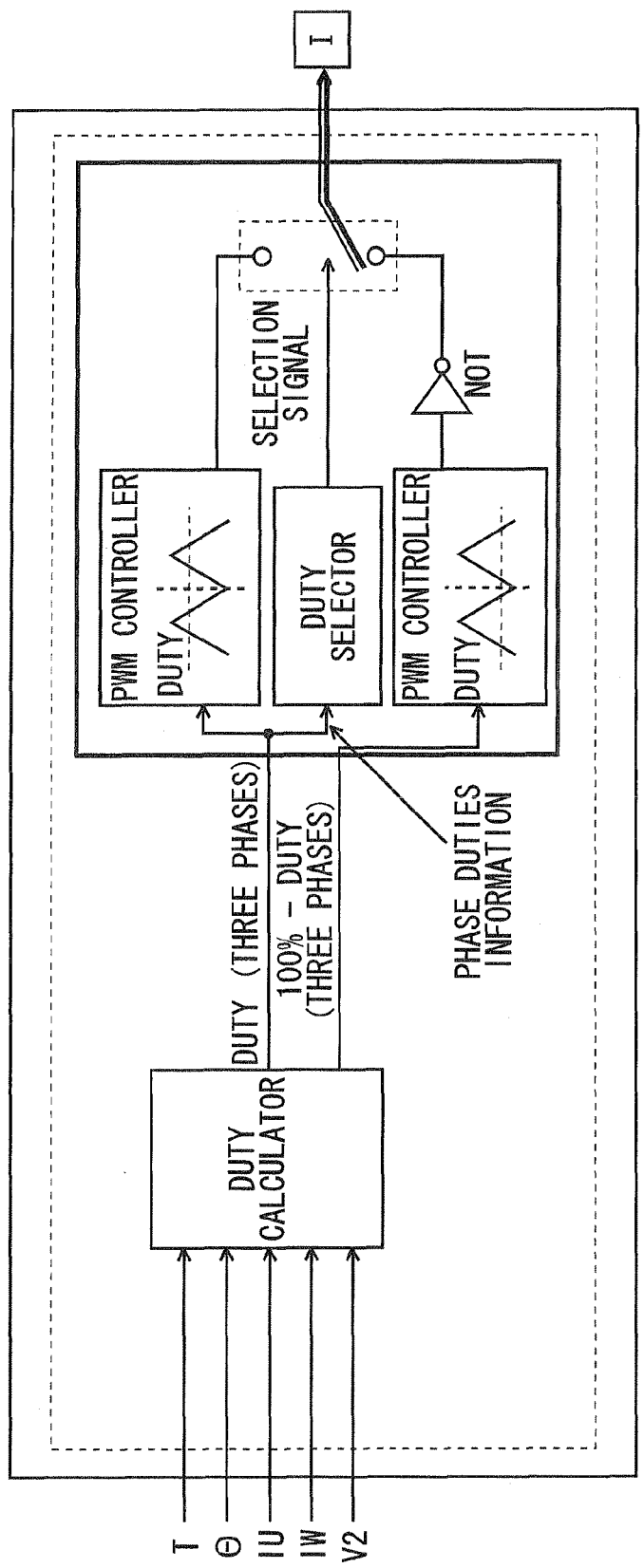
FIG. 16

CONTROLLER FOR LOAD DRIVE SYSTEM

CROSS-REFERENCE TO RELATED APPLICATION

This Application is a National Stage entry of International Application No. PCT/JP2010/058628, having an international filing date of May 21, 2010; which claims priority to Japanese Application No.: 2009-138314, filed Jun. 9, 2009, the disclosure of each of which is hereby incorporated in its entirety by reference.

TECHNICAL FIELD

The present invention relates to a controller for a load drive system which PWM controls an inverter with a two-phase modulation.

BACKGROUND ART

A load drive system for driving a load such as an electric motor includes a direct-current (DC) power supply, a step-up or step-down DC/DC converter, an inverter which transforms direct-current (DC) power into alternating-current (AC) power, a DC link capacitor which is provided between the DC/DC converter and the inverter for smoothing a DC voltage and a load. In the load drive system, the DC/DC converter, the DC link capacitor and the inverter may be configured as a module. In this case, a current from the DC/DC converter to the DC link capacitor and a current from the DC link capacitor to the inverter influence each other, whereby a ripple current which flows in the DC link capacitor is increased. In view of the lifetime of the DC link capacitor, a loss generated in the DC link capacitor and the size of the module, it is desirable that the ripple current is small.

FIG. 7 illustrates the configurations of a motor drive system and an inverter in the motor drive system. FIG. 8 illustrates operating waveforms when carrier signals of the inverter and the DC/DC converter are optimized. A control circuit 60 for the motor drive system illustrated in FIG. 7 controls so as to synchronize a frequency of an inverter carrier signal for driving a PWM (Pulse Width Modulation) inverter 20 of a triangular wave comparison system with a frequency of a DC/DC converter carrier signal for driving a DC/DC converter 40 so that a center of a time period during which an input current Ip to the inverter 20 becomes zero and a center of a time period during which an output current Io from the DC/DC converter 40 coincide with each other. In an example illustrated in FIG. 8, the frequency of the DC/DC converter carrier signal is controlled to be twice the frequency of the inverter carrier signal for synchronization. A pulse timing of the current flowing from the DC/DC converter to the DC link capacitor coincides with a pulse timing of the current flowing from the DC link capacitor to the inverter. Therefore, a ripple current Icap which flows in the DC link capacitor 30 becomes small.

RELATED ART LITERATURE

Patent Literature

Patent Literature 1: JP-2006-101675-A

SUMMARY OF THE INVENTION

Problem that the Invention is to Solve

In the motor drive system of Patent Literature 1, when the carrier signal of the inverter 20 rises up to a peak or falls down to a valley, the inverter 20 PWM controlled with a three-phase modulation is put into a voltage zero vector state, and therefore, the input current Ip to the inverter 20 becomes zero. On the other hand, when the carrier signal of the DC/DC converter 40 falls down to a valley, the output current Io from the DC/DC converter 40 becomes zero. Consequently, in the motor drive system, in order to make the input current Ip to the inverter 20 coincide in phase with the output current Io from the DC/DC converter 40, the respective frequencies of the carrier signals are set so that the carrier signal of the DC/DC converter 40 falls down to the valley at the same timing as the timing at which the carrier signal of the inverter 20 rises up to the peak or falls down to the valley.

On the other hand, in a case where the inverter is PWM controlled with a two-phase modulation in order to reduce a switching loss, the timing at which the input current to the inverter becomes zero changes as compared with in a case where the inverter is PWM controlled with a three-phase modulation. Thus, in the motor drive system described in Patent Literature 1, when the inverter 20 is PWM controlled with the two-phase modulation, the same advantage cannot be provided. Namely, Patent Literature 1 assumes a case where the inverter 20 is PWM controlled with the three-phase modulation.

Hereinafter, the two-phase modulation will briefly be described. FIG. 9A illustrates phase voltages and interphase voltages when the inverter is PWM controlled with the three-phase modulation. FIG. 9B illustrates phase voltages and interphase voltages when the inverter is PWM controlled with the two-phase modulation. As FIGS. 9A and 9B illustrate, the interphase voltages are the same regardless of whether the three-phase modulation or the two-phase modulation, and the output to the load is also the same. However, when the inverter is PWM controlled with the two-phase modulation as FIG. 9B illustrates, the duty of any one phase in three phases remains 0% or 100%, and this state is repeated alternately in the respective phases. In the example illustrated in FIG. 9B, the duties of the phases change every electrical angle of 60 degrees in such a way as V phase duty 100%→U phase duty 0%→W phase duty 100%→V phase duty 0%→U phase duty 100%→W phase duty 0%. Since no switching has to be performed for the phase whose duty does not change, the switching loss in the case of the two-phase modulation can be reduced to two thirds the switching loss in the case of the three-phase modulation. In the example illustrated in FIG. 9B, although the time period during which the duties of the phases remain 0% or 100% is exemplified as the electrical angle of 60 degrees, for example, the time period may be an electrical angle of 30 degrees.

FIG. 10 illustrates respective PWM signals of V phase, U phase and W phase which are obtained from respective command voltages of those phases which correspond to an inverter carrier signal and an input current to the inverter when the inverter is PWM controlled with the three-phase modulation. FIGS. 11A and 11B illustrate respective PWM signals of V phase, U phase and W phase which are obtained from respective command voltages of those phases which correspond to an inverter carrier signal and an input current to the inverter when the inverter is PWM controlled with the two-phase modulation. FIG. 11A illustrates a case where duties are 0%, and FIG. 11B illustrates a case where duties are 100%.

As FIGS. 10, 11A and 11B illustrate, no input current to the inverter is generated in the time period during which the PWM signals of all the three phases are ON or the PWM signals of all the three phases are OFF. Consequently, as FIG. 10 illustrates, when the inverter is PWM controlled with the three-phase modulation, the input current to the inverter is generated between the timing at which the inverter carrier signal rises up to the peak and the timing at which the inverter carrier signal falls down to the valley. On the other hand, as FIGS. 11A and 11B illustrate, when the inverter is PWM controlled with the two-phase modulation, the input current to the inverter when the duties are 0% is generated at the time point at which the inverter carrier signal is at the peak. And, the input current to the inverter when the duties are 100% is generated at the time point at which the inverter carrier signal is at the valley.

FIG. 12 illustrates input currents to the inverter corresponding to an inverter carrier signal when the inverter is PWM controlled with the three-phase modulation and the two-phase modulation, respectively. As FIG. 12 illustrates, the input current is inputted to the inverter in synchronism with peaks and valleys of the inverter carrier signal when the inverter is PWM controlled with the three-phase modulation. However, when the inverter is controlled in the same manner as with the two-phase modulation, timings at which the input of the input current to the inverter is synchronized with the inverter carrier signal differ from each other between when the duty of any of the phases is 0% and when the duty is 100%.

FIG. 13 illustrates an inverter carrier signal, a DC/DC converter carrier signal synchronized with the inverter carrier signal and having the same cycle as that of the inverter carrier signal, an input current Ip to the inverter corresponding to the inverter carrier signal when the inverter is PWM controlled with the two-phase modulation, an output current Io from the DC/DC converter corresponding to the DC/DC converter carrier signal and a ripple current Icap (Io−Ip) which flows in the DC link capacitor. FIG. 13 illustrates the signals and the currents when the state in which the duty of the U phase is 0% shifts to the state in which the duty of the W phase is 100%, as FIG. 9B illustrates.

As FIG. 13 illustrates, when the inverter is PWM controlled with the two-phase modulation, upon a shift of the state in which the duty of any (the U phase) of the phases is 0% to the state in which either (the W phase) of the remaining two phases is 100%, the timing at which the input current Ip inputted to the inverter is generated deviates from the timing at which the output current Io from the DC/DC converter is generated. Thus, as an oval shape indicated by a dotted line in FIG. 13, the ripple current flowing in the DC link capacitor is increased.

FIG. 13 illustrates a case where the timing at which the input current Ip to the inverter is generated and the timing at which the output current Io from the DC/DC converter is generated are set to coincide with each other when the duty of any of the phases is 0%. Contrary, in a case where the timing at which the input current Ip to the inverter is generated and the timing at which the output current Io from the DC/DC converter is generated are set to coincide with each other when the duty of any of the phases is 100%, when the state in which the duty of any of the phases is 100% shifts to the state in which the duty of either of the remaining two phases is 0%, the timing at which the input current Ip to the inverter is generated and the timing at which the output current Io from the DC/DC converter is generated deviate from each other.

Thus, in the motor drive system disclosed in Patent Literature 1, the timing at which the input current Ip to the inverter is generated and the timing at which the output current Io from the DC/DC converter deviate from each other when the inverter is PWM controlled with the two-phase modulation, and the ripple current Icap flowing in the DC link capacitor 30 cannot be reduced.

An object of the invention is to provide a controller for a load drive system which can reduce the ripple current flowing in the smoothing capacitor even when the inverter is PWM controlled with the two-phase modulation.

Means for Solving the Problem

Claim 1 provides a controller for a load drive system (e.g., a controller 100 in the embodiment),
the load drive system including:
a converter (e.g., a step-up converter 105 in the embodiment) configured to boost or lower an output voltage of a DC power supply (e.g., a DC power supply 101 in the embodiment);
an inverter (e.g., an inverter 107 in the embodiment) configured to transform a DC voltage outputted from the converter into a three-phase AC voltage to be applied onto a load (e.g., an electric motor 103 in the embodiment); and
a smoothing capacitor (e.g., a smoothing capacitor C in the embodiment) provided in parallel between the converter and the inverter,
the controller including:
an inverter controller (e.g., an inverter controller 100I in the embodiment) configured to PWM control the inverter with a two-phase modulation; and
a converter controller (e.g., a converter controller 100C in the embodiment) configured to PWM control the converter,
wherein a frequency of an inverter carrier signal used by the inverter controller to PWM control the inverter and a frequency of a converter carrier signal used by the converter controller to PWM control the converter are set so that a generation timing of an input current to the inverter and a generation timing of an output current from the converter coincide with each other every one or more cycles of the respective carrier signals, and
wherein there is provided a correction means configured to, when the generation timing of the input current and the generation timing of the output current do not coincide with each other upon a change of the generation timing of the input current to the inverter with the frequencies of the respective carrier signals unchanged, correct these generation timings so as to coincide with each other.

Claim 2 provides, based on Claim 1, the controller,
wherein the correction means shifts a phase difference between the inverter carrier signal and the converter carrier signal by an amount corresponding to the change of the generation timing of the input current.

Claim 3 provides, based on Claim 1, the controller,
wherein the correction means shifts a generation timing of a PWM control output by an amount corresponding to the change of the generation timing of the input current.

Claim 4 provides, based on Claim 1, the controller,
wherein, when the generation timing of the input current delays half a cycle, the converter controller switches the converter carrier signal between a synchronous converter carrier signal and a phase-shifted converter carrier signal, the synchronous converter carrier signal having a phase synchronized with a phase of the inverter carrier signal, the phase-shifted converter carrier signal having a phase shifted half a cycle from the phase of the inverter carrier signal.

Claim 5 provides, based on Claim 4, the controller,
wherein the phase of the phase-shifted converter carrier signal advances by half a cycle than the phase of the synchronous converter carrier signal.

Claim 6 provides, based on Claim 4, the controller, wherein the phase of the phase-shifted converter carrier signal delays by half a cycle than the phase of the synchronous converter carrier signal, and wherein the converter controller stops the output of the carrier signal for a time period equal to half the cycle immediately after the switch of the synchronous converter carrier signal to the phase-shifted converter carrier signal.

Advantage of the Invention

According to Claims 1 to 6, the ripple current flowing in the smoothing capacitor can be reduced even when the inverter is PWM controlled with the two-phase modulation.

BRIEF DESCRIPTION OF THE DRAWINGS

FIG. 1 illustrates an electric motor drive system according to a first embodiment.

FIG. 2 illustrates a PMW signal obtained from a command voltage corresponding to a converter carrier signal and an output current from a converter 5 when the converter 105 is PWM controlled while an electric motor 103 is power driven.

FIG. 3 illustrates an internal configuration of a controller 100 of the first embodiment.

FIG. 4 illustrates an inverter carrier signal, a state-dependent converter carrier signal, an input current Ip to an inverter 107 when the inverter 107 is two-phase modulated, an output current Io from the converter 105 corresponding to the converter carrier signal and a ripple current Icap (Io−Ip) which flows in a smoothing capacitor C, in a case where a carrier signal output part 301B outputs a phase-shifted converter carrier signal whose phase advances by half a cycle than that of a synchronous converter carrier.

FIG. 5 illustrates an inverter carrier signal, a state-dependent converter carrier signal, an input current Ip to the inverter 107 when the inverter 107 is two-phase modulated, an output current Io from the converter 105 corresponding to the converter carrier signal and a ripple current Icap (Io−Ip) which flows in the smoothing capacitor C, in a case where the carrier signal output part 301B outputs a phase-shifted converter carrier signal whose shift delays by half a cycle than that of a synchronous converter carrier signal.

FIG. 6 illustrates a system including a step-up/step-down converter.

FIG. 7 illustrates the configurations of a motor drive system disclosed in Patent Literature 1 and an inverter included in the motor drive system.

FIG. 8 illustrates operating waveforms when the carrier signals of the inverter and the DC/DC converter are optimized.

FIG. 9A illustrates phase voltages and interphase voltages when the PWM control is performed with a three-phase modulation, and FIG. 9B illustrates phase voltages and interphase voltages when the PWM control is performed with a two-phase modulation.

FIG. 10 illustrates respective PWM signals of U phase, V phase and W phase which are obtained from respective command voltages of those phases which correspond to an inverter carrier signal when the inverter is PWM controlled with the three-phase modulation.

FIGS. 11A and 11B each illustrates respective PWM signals of U phase, V phase and W phase which are obtained from respective command voltages of those phases which correspond to an inverter carrier signal and an input current to the inverter when the inverter is PWM controlled with the two-phase modulation.

FIG. 12 illustrates input currents to the inverter which correspond to an inverter carrier signal when the inverter is three-phase modulated and two-phase modulated, respectively.

FIG. 13 illustrates an inverter carrier signal, a DC/DC converter carrier signal with the same cycle as that of the inverter carrier signal, an input current Ip to the inverter which corresponds to the inverter carrier signal when the inverter is two-phase modulated, an output current Io from the DC/DC converter which corresponds to the DC/DC converter carrier signal and a ripple current Icap (Io−Ip) which flows in a DC link capacitor.

FIG. 14 illustrates an internal configuration of an inverter controller for shifting the phase of an inverter carrier signal.

FIG. 15 illustrates an internal configuration of a controller 200 which can correct the duty of a PWM control for the converter 105.

FIG. 16 illustrates an internal configuration of an inverter controller which can correct the duty of a PWM control for the inverter 107.

MODE FOR CARRYING OUT THE INVENTION

Hereinafter, an embodiment of the invention will be described by reference to the drawings. In this embodiment, it is assumed that the cycle of an inverter carrier signal is the same as the cycle of a converter carrier signal.

FIG. 1 illustrates an electric motor drive system according to a first embodiment. In the system illustrated in FIG. 1, a step-up converter (converter) 105, an inverter 107 and a smoothing capacitor C are provided between a DC power supply 101 such as a battery and an electric motor 103. The converter 105 boosts an output voltage V1 from the DC power supply 101. The inverter 107 transforms an output voltage V2 from the converter 105 into a three-phase (U, V, W) AC voltage. The inverter 107 is PWM controlled with a two-phase modulation. The smoothing capacitor C is provided in parallel between the converter 105 and the inverter 107 for smoothing a DC voltage.

The system includes a voltage sensor 109 for detecting the output voltage V1 of the DC power supply 101, a voltage sensor 111 for detecting the output voltage V2 of the converter 105 and current sensors 113u, 113w for detecting a u-phase current Iu and a w-phase current Iw which are outputted from the inverter 107, respectively. The system also includes a resolver 117 for detecting an electrical angle of a rotor of the electric motor 103. Signals indicating values detected by the voltage sensors 109, 111, the current sensors 113u, 113w and the resolver 117 are sent to a controller 100. A voltage command V2c and a torque command value T to the converter 105 are also inputted into the controller 100 from the outside.

The controller 100 respectively controls the converter 105 and the inverter 107. As FIG. 1 illustrates, the controller 100 includes a converter controller 100C for controlling the converter 105 and an inverter controller 100I for controlling the inverter 107. The converter controller 100C PWM controls the switching of transistor(s) in the converter 105. FIG. 2 illustrates a PWM signal which is obtained from a command voltage corresponding to a converter carrier signal and an output current from the converter 105 when the converter 105 is PWM controlled while the electric motor 103 is power driven.

The inverter controller 100I PWM controls the switching of transistor(s) in the inverter 107 with a two-phase modulation. The inverter controller 100I inputs information (phase duties information) indicating respective duties of the phases illustrated in FIG. 9B into the converter controller 100C.

FIG. 3 illustrates an internal configuration of the controller 100 of the first embodiment. As FIG. 3 illustrates, the converter controller 100C has a duty calculator 201 and a PWM controller 203. A detection value of an output voltage V1 of the DC power supply 101, a detection value of an output voltage V2 of the converter 105, a voltage command V2c to the converter 105 and phase duties information are inputted into the converter controller 100C.

A command voltage V2c, the detected output voltage V1 of the DC power supply 101 and a deviation ΔV2 between the command voltage V2c and the output voltage V2 (V2c−V2) are inputted into the duty calculator 201. The duty calculator 201 calculates a feedforward duty (Dutty_FF) by which the converter 105 boosts the output voltage V1 to a value corresponding to the command voltage V2c. Further, the duty calculator 201 calculates a feedback duty (Duty_FB) for correcting the feedforward duty (Duty_FF) based on the deviation ΔV2, the output voltage V and the feedforward duty (Duty_FF). The duty calculator 201 outputs a duty (Duty) by correcting the feedforward duty (Duty_FF) with the feedback duty (Duty_FB). The duty (Duty) calculated by the duty calculator 201 is inputted into the PWM controller 203.

The duty (Duty) calculated by the duty calculator 201 and the phase duties information are inputted into the PWM controller 203. As FIG. 3 illustrates, the PWM controller 203 has a carrier signal output part 301A, a carrier signal output part 301B, a carrier signal phase selector 303, a switching part 305 and a PWM signal generator 307.

The carrier signal output part 301A outputs a carrier signal (a synchronous converter carrier signal) of which a frequency is equal to and a phase is synchronous with those of a carrier signal (an inverter carrier signal) used when the inverter controller 100I PWM controls the inverter 107. On the other hand, the carrier signal output part 301B outputs a carrier signal (a phase-shifted converter carrier signal) of which a frequency is equal to but a phase shifts half a cycle from those of the inverter carrier signal.

The carrier signal phase selector 303 outputs to the switching part 305 selection signals corresponding to respective duties of the phases indicated by the phase duties information. The carrier signal phase selector 303 outputs a selection signal to the switching part 305 so that the synchronous converter carrier signal is inputted into the PWM signal generator 307 while the duty of any of the phases is 0%, and so that the phase-shifted converter carrier signal is inputted into the PWM signal generator 307 while the duty of any of the phases is 100%.

The switching part 305 switches the converter carrier signals to be inputted into the PWM signal generator 307 in response to the selection signal outputted from the carrier signal phase selector 303. The converter carrier signal (the synchronous converter carrier signal or the phase-shifted converter carrier signal) switched by the switching part 305 is inputted into the PWM signal generator 307. As FIG. 2 illustrates, the PWM signal generator 307 generates a PWM signal corresponding to the converter carrier signal inputted thereinto via the switching part 305 and the command voltage.

According to the embodiment, when the state in which the duty of any of the phases is 0% changes to the state in which the duty of either of the remaining two phases is 100%, the carrier signal phase selector 303 outputs a selection signal which switches the converter carrier signal to be inputted into the PWM signal generator 307 from the synchronous converter carrier signal to the phase-shifted converter carrier signal. And, when the state in which the duty of any of the phases is 100% changes to the state in which the duty of either of the remaining two phases is 0%, the carrier signal phase selector 303 outputs a selection signal which switches the converter carrier signal to be inputted into the PWM signal generator 307 from the phase-shifted converter carrier signal to the synchronous converter carrier signal.

FIGS. 4 and 5 each illustrates an inverter carrier signal, a state-dependent converter carrier signal, an input current Ip to the inverter 107 when the inverter 107 is two-phase modulated, an output current Io from the converter 105 which corresponds to the converter carrier signal and a ripple current Icap (Io−Ip) which flows in the smoothing capacitor C. FIG. 4 illustrates an example in which the carrier signal output part 301B outputs a phase-shifted converter carrier signal whose phase advances by half a cycle than that of the synchronous converter carrier signal. FIG. 5 illustrates an example in which the carrier signal output part 301B outputs a phase-shifted converter carrier signal whose phase delays by half the cycle than that of the synchronous converter carrier signal.

As FIGS. 4 and 5 illustrate, when the duty of any of the phases is 100%, a PWM signal is generated based on the phase-shifted converter carrier signal, whereby the timing at which the output current Io from the converter 105 is generated is synchronized with the timing at which the input current Ip to the inverter is generated. Thus, the ripple current Icap (Io−Ip) which flows in the smoothing capacitor C can be held to a small value.

As FIG. 5 illustrates, in a case where the phase-shifted converter carrier signal whose phase delays half the cycle is used, the carrier signal output part 301 may stop the output of the carrier signal during a time period equal to half the cycle immediately after the converter carrier signal is switched from the synchronous converter carrier signal to the phase-shifted converter carrier signal. In this case, since the output current Io from the converter 105 is zero while the output of the carrier signal is being stopped, and the smoothing capacitor C is affected by the input current Ip to the inverter 107.

As described above, according to the embodiment, even when the inverter 107 is PWM controlled with the two-phase modulation, the timing at which the output current Io from the converter 105 is generated can be synchronized with the timing at which the input current Ip to the inverter 107 is generated by shifting the phase of the converter carrier signal in accordance with the change in duty. Consequently, the ripple current which flows in the smoothing capacitor C can be suppressed low. Thus, the lifetime of the smoothing capacitor C can be held long, the loss generated in the smoothing capacitor C can be reduced, and the module including the smoothing capacitor C can be made small in size.

In the embodiment, the timing at which the input current Ip to the inverter 107 is generated is set to coincide with the timing at which the output current Io from the converter 105 is generated by using the synchronous converter carrier signal when the duty of any of the phases is 0%. However, as another embodiment, the timings at which both the currents are generated may be set to coincide with each other by using the synchronous converter carrier signal when the duty of any of the phases is 100%. As this occurs, the carrier signal phase selector 303 outputs the selection signal which changes the converter carrier signal to be inputted into the PWM signal generator 307 from the synchronous converter carrier signal to the phase-shifted converter carrier signal when the state in which the duty of any of the phases is 100% changes to the state in which the duty of either of the remaining two phases is 0%. And, the carrier signal phase selector 303 outputs the selection signal which changes the converter carrier signal to be inputted into the PWM signal generator 307 from the phase-shifted converter carrier signal to the synchronous converter carrier signal when the state in which the duty of any of the phases is 0% changes to the state in which the duty of either of the remaining two phases is 100%.

In the embodiment, the step-up converter 105 is exemplified. However, a step-up/step-down converter 505 illustrated in FIG. 6 or a step-down converter may be used.

In the embodiment, it is assumed that the cycle of the inverter carrier signal coinciding with the cycle of the converter carrier signal. However, these cycles may not coincide with each other. Alternatively, the cycles may coincide with each other every a certain number of cycles.

In the embodiment, the phase of the converter carrier signal is shifted. However, the phase of the inverter carrier signal may be shifted so that the timing at which the output current Io from the converter 105 is generated coincides with the timing at which the input current Ip to the inverter 107 is generated. FIG. 14 illustrates an internal configuration of an inverter controller which shifts the phase of the inverter carrier signal. As FIG. 14 illustrates, the inverter controller has the same configuration as that of the converter controller 100C illustrated in FIG. 3.

In stead of shifting the phase of the converter carrier signal or the inverter carrier signal, the duty of the PWM control for the converter 105 or the duty of the PWM control for the inverter 107 may be corrected. FIG. 15 illustrates an internal configuration of a controller 200 which can correct the duty of a PWM control for the converter 105. FIG. 16 illustrates an internal configuration of an inverter controller which can correct the duty of a PWM control for the inverter 107.

Although the invention has been described in detail and by reference to the specific embodiment, it is obvious to those skilled in the art to which the invention pertains that various alterations or modifications can be made to the embodiment of the invention without departing from the spirit and scope of the invention.

This patent application is based on Japanese Patent Application (No. 2009-138314) filed on Jun. 9, 2009, the contents of which are to be incorporated herein by reference.

DESCRIPTION OF REFERENCE NUMERALS AND CHARACTER 100 controller; 100C converter controller; 100I inverter controller; 101 DC power supply; 103 electric motor; 105 step-up converter; 107 inverter; C smoothing capacitor; 109, 111 voltage sensor; 113u, 113w current sensor; 117 resolver; 201 duty calculator; 203 PWM controller; 301A carrier signal output part; 301B carrier signal output part; 303 carrier signal phase selector; 305 switching part; 307 PWM signal generator.

The invention claimed is:
1. A controller for a load drive system, the load drive system comprising:
a converter configured to boost or lower an output voltage of a DC power supply;
an inverter configured to transform a DC voltage outputted from the converter into a three-phase AC voltage to be applied onto a load; and
a smoothing capacitor provided in parallel between the converter and the inverter,
the controller comprising:
an inverter controller configured to PWM control the inverter with a two-phase modulation; and
a converter controller configured to PWM control the converter,
wherein a frequency of an inverter carrier signal used by the inverter controller to PWM control the inverter and a frequency of a converter carrier signal used by the converter controller to PWM control the converter are set so that a generation timing of an input current to the inverter and a generation timing of an output current from the converter coincide with each other every one or more cycles of the respective carrier signals, and
wherein there is provided a correction means configured to, when the generation timing of the input current and the generation timing of the output current do not coincide with each other upon a change of the generation timing of the input current to the inverter with the frequencies of the respective carrier signals unchanged, correct these generation timings so as to coincide with each other.

2. The controller of claim 1,
wherein the correction means shifts a phase difference between the inverter carrier signal and the converter carrier signal by an amount corresponding to the change of the generation timing of the input current.

3. The controller of claim 1,
wherein the correction means shifts a generation timing of a PWM control output by an amount corresponding to the change of the generation timing of the input current.

4. The controller of claim 1,
wherein, when the generation timing of the input current delays half a cycle, the converter controller switches the converter carrier signal between a synchronous converter carrier signal and a phase-shifted converter carrier signal, the synchronous converter carrier signal having a phase synchronized with a phase of the inverter carrier signal, the phase-shifted converter carrier signal having a phase shifted half a cycle from the phase of the inverter carrier signal.

5. The controller of claim 4,
wherein the phase of the phase-shifted converter carrier signal advances by half a cycle than the phase of the synchronous converter carrier signal.

6. The controller of claim 4,
wherein the phase of the phase-shifted converter carrier signal delays by half a cycle than the phase of the synchronous converter carrier signal, and
wherein the converter controller stops the output of the carrier signal for a time period equal to half the cycle immediately after the switch of the synchronous converter carrier signal to the phase-shifted converter carrier signal.

* * * * *